US008670527B2

(12) United States Patent
Pirzada et al.

(10) Patent No.: US 8,670,527 B2
(45) Date of Patent: Mar. 11, 2014

(54) METHOD AND SYSTEM FOR DETECTING VOICE MAIL SPAM

(75) Inventors: Shamim Sharifuddin Pirzada, San Jose, CA (US); Anup V. Rao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1200 days.

(21) Appl. No.: 11/564,799

(22) Filed: Nov. 29, 2006

(65) Prior Publication Data

US 2008/0123823 A1  May 29, 2008

(51) Int. Cl.
*H04M 1/64* (2006.01)
(52) U.S. Cl.
USPC ............ 379/88.08; 379/88.16; 379/142.06; 707/735; 709/204; 704/231
(58) Field of Classification Search
USPC .............. 379/88.13, 206, 142.02–142.06, 379/142.08, 142.1, 67.1, 68, 85, 88.08, 379/88.16–88.18, 88.22, 88.23, 379/88.25–88.27; 370/401; 455/466; 707/735; 709/204–206; 704/231
See application file for complete search history.

(56) References Cited

U.S. PATENT DOCUMENTS

| 8,457,960 | B2 * | 6/2013 | Srivastava et al. | 704/231 |
| 2005/0259667 | A1 * | 11/2005 | Vinokurov et al. | 370/401 |
| 2007/0071200 | A1 * | 3/2007 | Brouwer | 379/142.05 |
| 2007/0124384 | A1 * | 5/2007 | Howell et al. | 709/206 |
| 2008/0004048 | A1 * | 1/2008 | Cai et al. | 455/466 |

OTHER PUBLICATIONS

Greene, Tim, "Researchers, Vendors, ISPs Attack 'Net Attackers," Network World (US ONLINE), ARNnet, www.arnnet.corn.au, Nov. 7, 2005.
Dantu, Ram, et al., "Detecting Spam in VoIP Networks," presentation at "Steps to Reducing Unwanted Traffic on the Internet Workshop," Cambridge, MA, Jul. 7, 2005.

* cited by examiner

*Primary Examiner* — MD S Elahee
(74) *Attorney, Agent, or Firm* — Baker Botts L.L.P.

(57) ABSTRACT

A method can include detecting an incoming voice mail message and accessing information associated with the incoming voice mail message. The information associated with the incoming voice message may then be compared with some other information, which may comprise one or more of these attributes associated with each message: a caller ID; a time stamp; a user extension; a message length; a caller identification; message content; and whether a user has tagged each message as spam.

23 Claims, 5 Drawing Sheets

METHOD AND SYSTEM FOR DETECTING VOICE MAIL SPAM

TECHNICAL FIELD

The present disclosure relates generally to communications, and more particularly to a method, system and device for detecting voice mail spam.

BACKGROUND

Modern internetworking and related technologies allow beneficial communications, file sharing and other useful applications. Electronic mail ("email"), for instance, provides a virtually cost-free medium for communication with others. The low cost of email communications can achieve even greater economical benefit by sending a particular email message to multiple recipients. But email, as a communication medium, is subjected to misuse. For example, unscrupulous advertisers can exploit email's advantage by sending unwanted, unsolicited, and annoying email messages. Such troublesome email messages comprise spam and there are many approaches to combat email spam.

Internet Protocol (IP) telephony is another fast growing application that provides low cost communication with others. The advantages of IP telephony typically relate to feature availability and cost savings. As IP telephony is increasingly used in open network environments, users may receive more unsolicited and/or unwanted calls and messages.

Unsolicited and/or unwanted calls over IP telephony are known as "Spam over IP telephony" (SPIT). SPIT deals with unwanted voice calls before the calls are answered, and once the calls are answered, it is too late to categorize the calls as SPIT.

On the other hand, unsolicited commercial voice mail messages, or voice mail spam, present different challenges as compared to email spam and SPIT. Voice mail spam involves unsolicited messages left in a voice mail system (for example, the unsolicited messages left in an enterprise voice mail system, e.g., Cisco's Unity system). Voice mail spam is an especially expensive problem for users who retrieve messages from the voice mail system via cell phones or long distance calls. Voice mail spam causes users to spend real dollars (air time, per minute charges, toll free charges to enterprise etc) on messages they do not want to listen, not even to mention wasting their precious time.

DESCRIPTION OF EXAMPLE EMBODIMENTS

Overview

A method to detect voice mail spam in a voice mail system includes detecting an incoming voice mail message and accessing information associated with the incoming voice mail message. The information associated with the incoming voice message is then compared with some other information, such as information associated with other voice mail messages in the voice mail system or an information database associated with known spammers. The method further includes categorizing one or more voice mail messages as suspected spam, if the preponderance of the information compared between the incoming message and one or more other messages in the voice mail system is within some configurable criteria, e.g., a configurable percentage. Alternatively, a particular voice mail message is categorized as spam if the information associated with the incoming message matches information in the information database associated with known spammers.

A system to detect voice mail spam includes an information repository and a voice mail system coupled to the information repository. The voice mail system includes means for detecting an incoming voice mail message and means for accessing information associated with the incoming voice mail message. The voice mail system also includes means for comparing the information associated with the incoming voice message with some other information and means for categorizing one or more voice mail messages as suspected spam.

BRIEF DESCRIPTION OF THE DRAWINGS

The foregoing and other objects, advantages and features will become more readily apparent by reference to the following detailed descriptions in conjunction with the accompanying drawings.

DESCRIPTIONS

Figure 1:
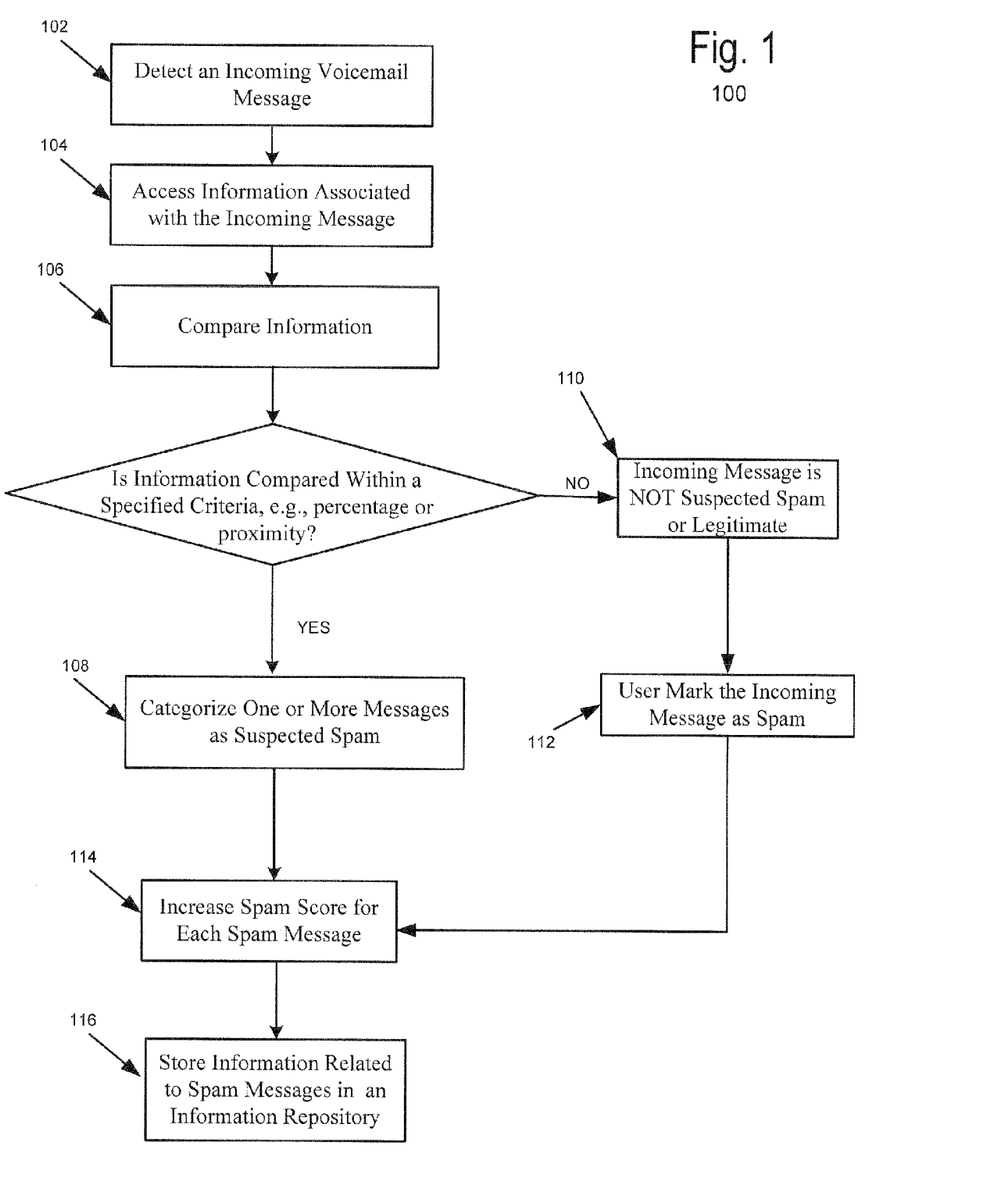
FIG. 1 is a flow chart illustrating an example method for detecting voice mail spam in a voice mail system.
Figure 4:
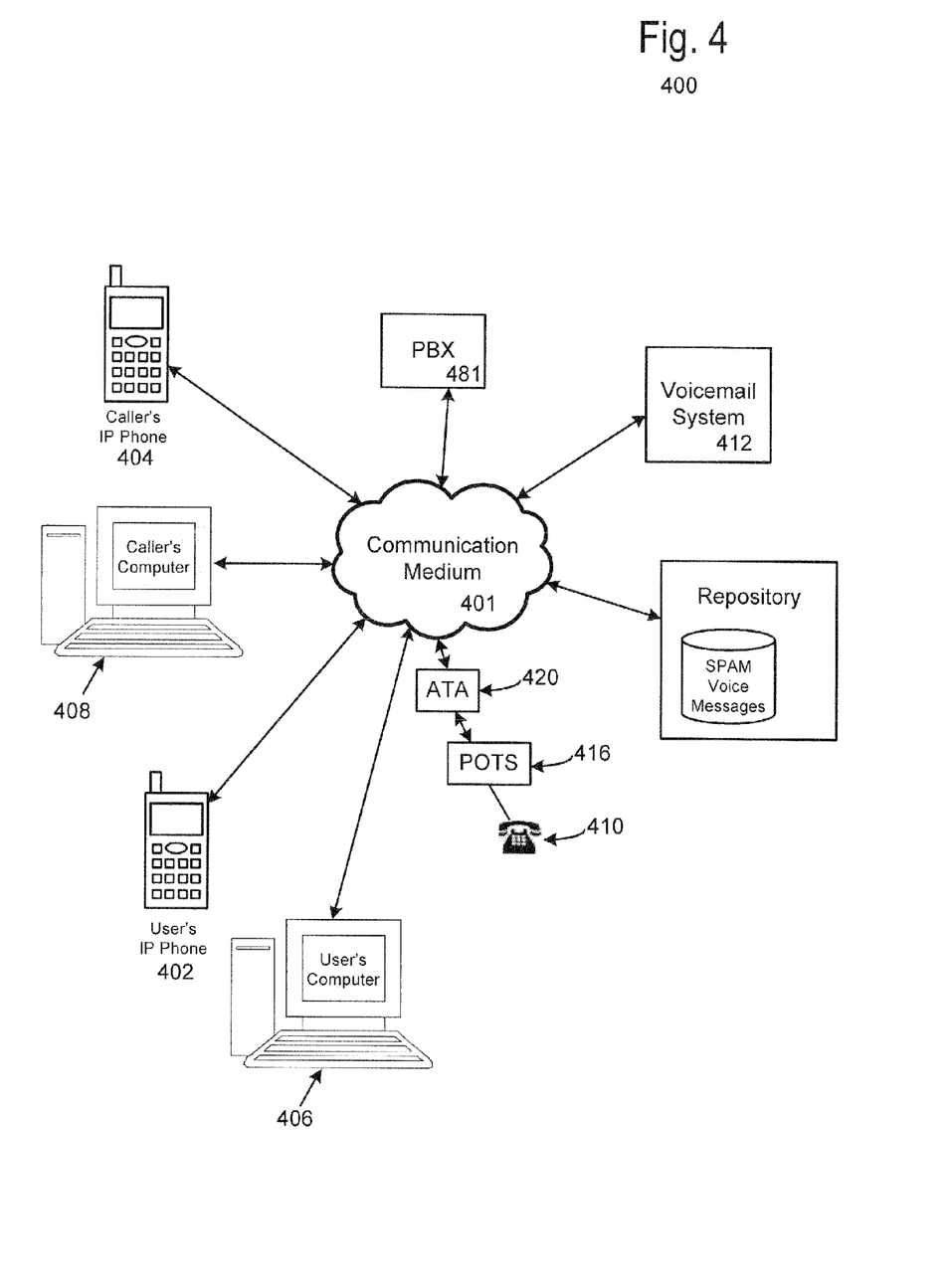
FIG. 4 is a schematic block diagram illustrating an example system for detecting voice mail spam in a voice mail system according to the methods in FIG. 1 and FIG. 2.

FIG. 1 is a flow chart illustrating an example method for detecting voice mail spam in a voice mail system, such as the voice mail system 412 shown in FIG. 4. The voice mail system is a system that is operable to store voice mail messages from a caller and to retrieve the stored voice mail message upon a user's request. For example, the voice mail system may be associated with a voice mail service provider, an entity that operates, manages, and administers the voice mail system, e.g., Cisco's Unity system. Alternatively, the voice mail system may be local to a user device, e.g., a telephone, deployed for instance as a component thereof, and readable therewith. The term "caller" or "speaker" refers to the person who leaves a voice mail message on the voice mail system, and the term "user" or "recipient" refers to the person for whom the voice message is intended or directed.

Method 100 begins with step 102, wherein an incoming voice mail message from a caller is detected in the voice mail system. In the following sections, the term "user" or "recipient" refers to the person for whom the voice message is intended.

In step 104, information associated with the voice mail message is accessed. The voice mail system has at its disposal several pieces of information that it can use to determine if a particular voice mail message is suspected spam. For example, the information associated with a particular voice mail message may comprise one or more of the following:

caller ID associated with the voice mail message
time the voice mail message was left in the voice mail system
extension of the user or recipient
length of the voice mail message knowledge about the caller (using standard speaker identification and verification techniques)

knowledge of what is being said (using standard automated speech recognition (ASR) or speech-to-text techniques)

knowledge of other same or similar messages left in the voice mail system knowledge of whether the recipient or user has marked this or similar messages as spam Even if the caller blocks the caller ID, the remaining factors are still available in a voice mail system to determine if a particular voice mail message is suspected spam. As for caller identification and utterance detection (knowledge of what being said in the message), both may require automatic speech recognition or ASR processing. Since modern voice mail system provides such speech recognition as a matter of course, re-using the resources to detect spam is relatively easy. Furthermore, the degree of accuracy required for each case is much less. For instance, there is no need to "identify" or "verify" precisely the speaker's identity, what really matters is whether the same speaker has left the messages under scrutiny. Similarly, there is no need to determine precisely what words were being said—just that the messages under scrutiny have certain percentage of words in common, e.g., 80%.

In addition to the ASR techniques, speech-to-text techniques (which literally convert arbitrary utterances into text) may be used to detect spam. Once a voice mail message has been converted into text, a text-based spam filter (such as ones currently used for email) can be used. Speech-to-text techniques have the drawback of inaccurate reproduction or conversion, which is tolerable in this instance, since there are other information attributes weighing in to detect spam.

Next the information associated with the incoming voice mail message (e.g., the information attributes described above) is compared with some other information. Specifically, in step 106, the information associated with the incoming voice mail message is compared with information associated with other voice mail messages (e.g., the information attributes described above) in the voice mail system. If the preponderance of the information compared between the incoming message and one or more other messages in the voice mail system is within some configurable percentage of each other or otherwise satisfying some configurable criteria (e.g., distance or proximity), then the incoming message and the other one or more messages are categorized as suspected spam in step 108. For example, assume there are three voice mail messages left in an enterprise voice mail system for three different employees at different time. Table 1 displays the relevant information associated with each message:

TABLE 1

| Message # | Caller ID | Time Message Left | Length of Message | Speaker/caller Identity | Utterance |
|---|---|---|---|---|---|
| 1 | 4085551212 | 2:30 pm | 3:21 | aaaaabb | ffaabbcc |
| 2 | 4085551213 | 2:33 pm | 3:15 | bbbbccc | ffbbbbcc |
| 3 | 4085551214 | 2:35 pm | 3:27 | aaaaabb | ccaabbcc |

All three messages share the same area code-exchange number (408-555-xxxx); they were left at around the same time; the lengths of the messages were about the same; similar words were being said; and the speaker/caller identity is similar for all. Furthermore, the preponderance of the information compared for each message is within some pre-configured percentage of each other, i.e., 5%. As a result, all three messages would be categorized as suspected spam.

In addition, there is a spam score associated with each message, i.e., ranges between [0-100]. The higher the score is, the more likely that a voice mail message is suspected span. For example, a spam score of 100 indicates that the message is clearly spam, whereas a score of zero indicates that the message is legitimate, any score between [0,100] indicates the likelihood that the message is spam. In the above example, as the number of messages within such criteria increases, i.e., same area code, same exchange number, same or similar length, etc, the spam score goes up for each of these messages. The spam score would go up considerably if any of these messages is marked as spam by the user or recipient. There is also a configurable threshold spam score. When the spam score associated with a particular voice message exceeds the threshold score, the message is marked as spam. Some mathematical algorithms may be implemented to determine the degree of increase for each spam score, which is not described herein.

On the other hand, if the preponderance of the information compared is not within some configurable percentage of each other or otherwise satisfying some configurable criteria, e.g., the incoming voice message does not share any similarity with the other voice mail messages in the voice mail system with respect to the information listed above, in step 110 the incoming voice message is not categorized as suspected spam. Alternatively, the message is categorized as legitimate.

When the user later calls in to retrieve the voice mail message from the voice mail system, he can mark the message as spam in step 112, e.g., press a hard, soft, or virtual key (i.e., touch pad on a display) on his phone to inform the voice mail system that the message is spam.

In summary, voice mail messages can be categorized as suspected spam by the voice mail system if the preponderance of the information compared between an incoming voice message and one or more other messages in the voice mail system is within some configurable percentage of each other or otherwise satisfying some specified criteria. Alternatively a user can mark the messages as spam via an appropriate user interface. In either case, the spam score associated with the spam voice mail messages would increase in step 114. In optional step 116, the information associated with spam voice mail messages is added to an information repository, such as the information repository 300 shown in FIG. 3.

Figure 2:
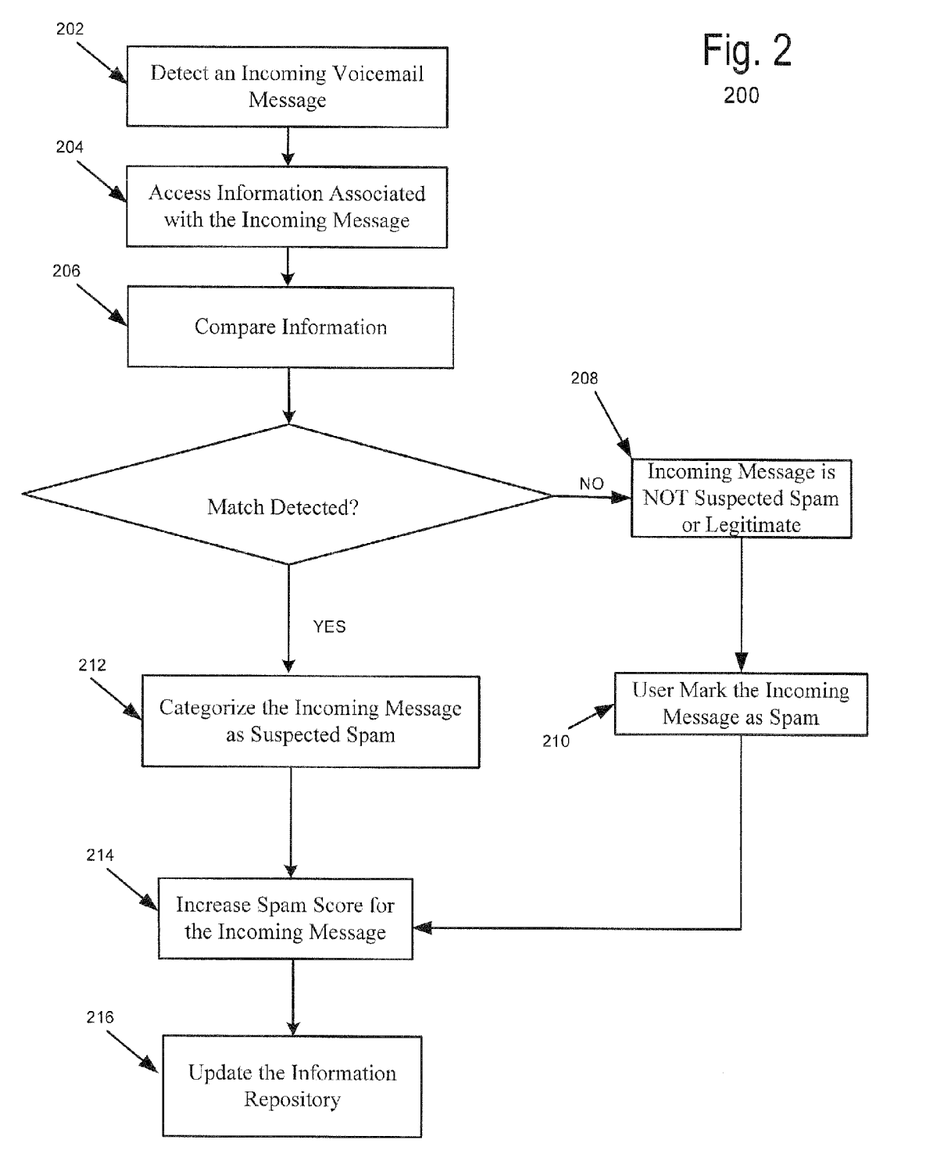
FIG. 2 is a flow chart illustrating another example method for detecting voice mail spam in a voice mail system.
Figure 3:
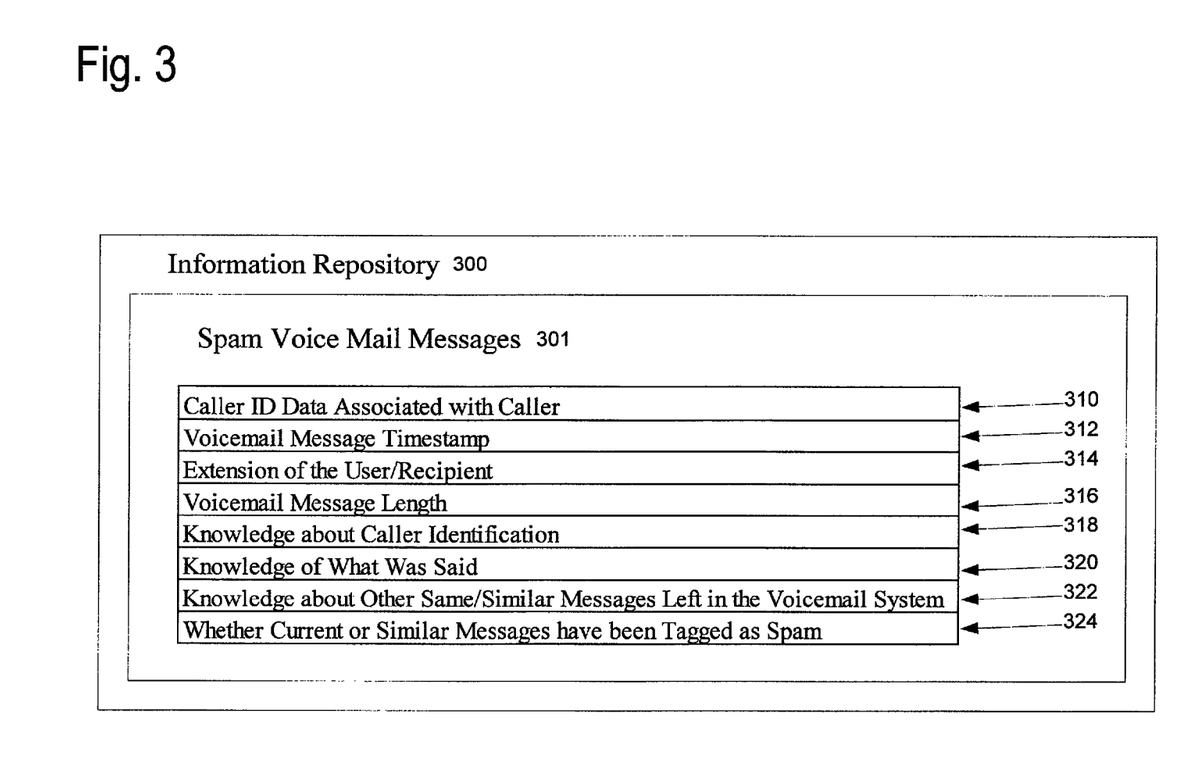
FIG. 3 is a diagram illustrating an example repository of information related to voice mail spam.

FIG. 2 is a flow chart illustrating another example method for detecting voice mail spam in a voice mail system, such as the voice mail system 312 shown in FIG. 3. The difference between the example method 100 and this particular method is the former compares the information for the incoming message with the other messages in the system for spam categorization, whereas, the latter categorizes an incoming voice message as spam as a result of the information attributes itself, such as by matching the incoming message's caller ID with a third-party reputation database of known spammers. For purpose of spam detection in a voice mail system, the methods can be used alone and/or in combination with each other.

Method 200 begins with step 202, wherein an incoming voice mail message from a caller is detected in the voice mail system. In step 204, information associated with the voice mail message is accessed. The following information is accessed for each incoming voice message, which may comprise one or more of the following:

caller ID associated with the voice mail message time the voice mail message was left in the voice mail system extension of the user or recipient length of the voice mail message knowledge about the caller (using standard speaker identification and verification techniques)

knowledge of what is being said (using standard automated speech recognition (ASR) or speech-to-text techniques)

knowledge of other same or similar messages left in the voice mail system knowledge of whether the recipient or user has marked this or similar messages as spam Next the information associated with the incoming voice mail message is compared with some other information in step 206. Specifically, the information associated with the incoming voice mail message is matched with an information database of known spammers (the database contains caller ID and/or any other information relates to known spammers, e.g., the information repository 300 in FIG. 3 or a third-party information database). If there is a match detected, in step 212, the incoming message is categorized as spam. The spam score associated with the incoming voice mail messages is increased in step 214. In optional step 216, the information repository (e.g., the information repository 300 shown in FIG. 3) is updated by adding the information associated with the incoming voice mail messages to the information repository.

On the other hand, if there is no match detected, in step 208, the incoming voice message is not categorized as suspected spam. Alternatively, the message is categorized as legitimate. When the user later calls in to retrieve the voice mail message from the voice mail system, he can mark the message as spam in step 210, e.g., press a hard, soft, or virtual key (i.e., touch pad on a display) on his phone to inform the voice mail system that the message is spam.

FIG. 3 depicts an example repository 300 of information related to known spammers. Repository 300 stores information 301 associated with known spam voice mail messages, which may comprise the following:

caller ID associated with the spam voice mail message 310 (including unidentified)

time the span voice mail message was left 312 extension of the user or recipient 314 length of the voice mail message 316 knowledge about the caller identification 318 (using standard speaker identification and verification techniques)

knowledge of what is being said 320 (using standard automated speech recognition (ASR) or speech-to-text techniques)

knowledge of other same or similar messages left in the voice mail system 322 knowledge of whether the recipient or user has tagged this or similar messages as spam 324

As explained earlier, automatic speech recognition (ASR) processing may be used to collect information related to caller identification and for utterance detection. Speech-to-text techniques may also be used. For both techniques, the degree of accuracy required is much less since there are other information attributes weighing in to detect spam.

Information repository 300 may be associated with a voice mail service provider, an entity that operates, manages, and administers the voice mail system. Alternatively, information repository 300 may be local to a user device, deployed for instance as a component thereof, and readable therewith. The information repository 300 is dynamically updated each time a voice mail message is categorized or marked as spam.

FIG. 4 depicts an example system 400 for detecting voice mail spam in a voice mail system according to methods described above with respect to FIG. 1 and FIG. 2. The communication medium 401 can be the Internet or another communication network. A caller communicates with a user located on a remote end of a communication channel via communication medium 401 using various technologies, such as IP telephones 402, 404, computers 406, 408, and/or analog phone 410. The analog phone 410 can access communication medium 401 from a plain old telephone system (POTS) 416 via analog telephone adapter 420.

When the user is not available to answer the call from the caller, the call is directed to voice mail system 412, where the caller can leave voice mail messages for the user. The user can subsequently call in to retrieve voice messages from voice mail system 412. Voice mail system 412 may be associated with a voice mail service provider, an entity that operates, manages, and administers the voice mail system, e.g., Cisco's Unity system. Alternatively, the voice mail system 412 may be local to a user device, deployed for instance as a component thereof, and readable therewith, as will be discussed later in FIG. 5.

Information repository 414 (e.g., the information repository 300 shown in FIG. 3) is communicatively coupled to voice mail system 412, e.g., via communication medium, 401. Alternatively, information repository 414 is deployed as a component of voice mail system 412 and is readable therewith. Information repository 414 stores spam voice mail messages and is dynamically updated each time a voice mail message is categorized or marked as spam. One example implementation of information repository 414 is the information repository shown in FIG. 3.

Once a particular message is categorized as suspected spam by voice mail system 412, those messages may be placed into a distinct "suspect spam" mailbox for the user, e.g., information repository 414. When a user calls in to check his voice mail messages via a telephone user interface (TUI), the voice mail system would respond with: "you have three new messages, five old messages and three suspected spam messages." The suspected spam messages may be the last ones to be dealt with.

A user of voice mail system 412, upon retrieving a voice mail message, can report the voice mail message as spam by pressing a designated key or button on an IP phone, a computer, or an analog phone device, e.g., press 9 to mark the message as spam. Similarly, for voice messages that are categorized as suspected spam, the voice mail system 412 can provide the user an option to mark those messages as legitimate, e.g., press 8 if you think the message is not spam.

Some voice mail systems, such as Cisco's Unity system, provide a web-based message retrieval interface. One example implementation of the user interface may be adding a radio button to mark the messages as spam. In another example, soft key features, implemented with a graphical user interface (GUI) on an IP phone, allow the user to mark the messages as spam.

Additionally, voice mail messages may be sent as wave file attachment to email messages, e.g., in a unified communication system. In this case, the system administrator can configure the system with several options:

For legitimate messages, add a URL to allow the user to mark the message as spam;

For suspected spam messages, write in the email subject line to indicate the messages are suspected span, and then insert a URL to allow the user to mark it as legitimate;

Send legitimate messages in the usual way, but with a URL to mark it as spam;

Send suspected spam messages as a digest once a week or some other configurable time period. This is similar to what is done for quarantined email messages.

The system and method described above are best used in conjunction with standard white-listing and black-listing techniques, i.e., to always mark calls from a particular number as spam and to always mark calls from a particular number as legitimate.

Figure 5:
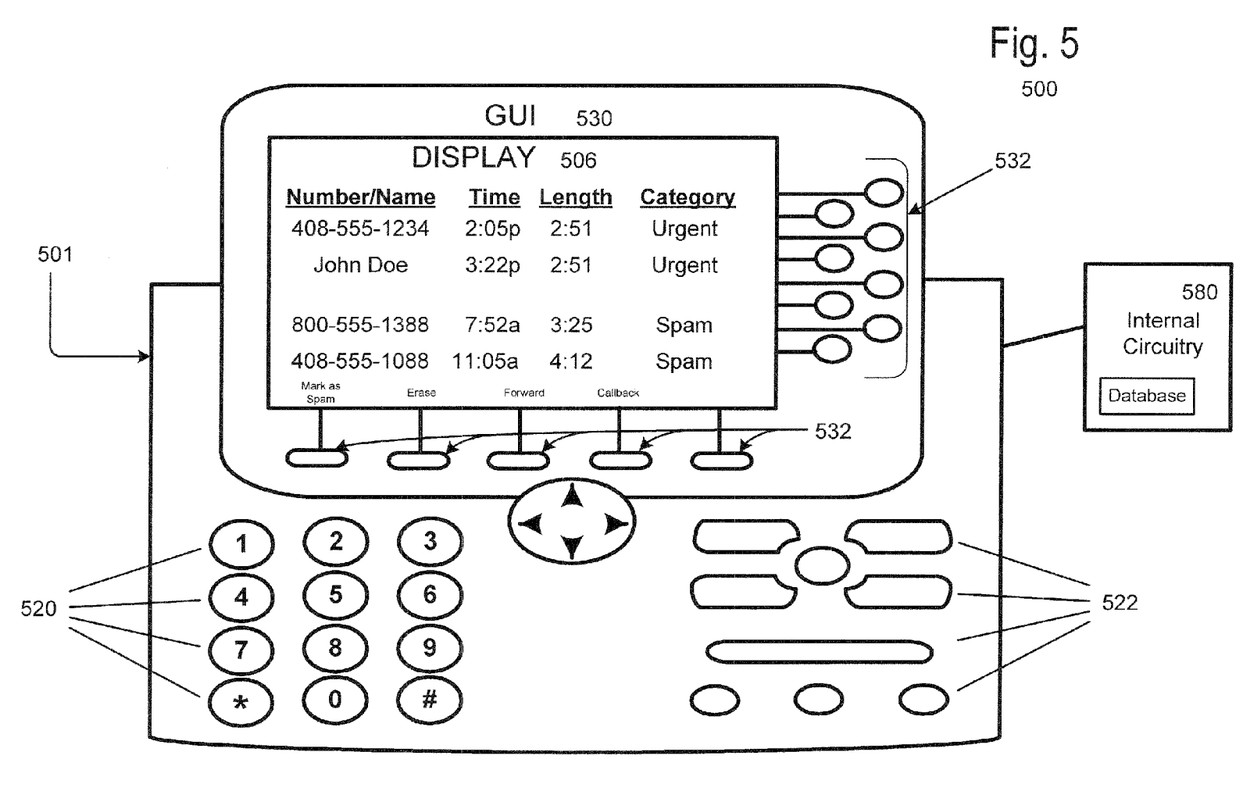
FIG. 5 is an example communication device for detecting voice mail spam according to the methods in FIG. 1 and FIG. 2.

FIG. 5 depicts a communication device 500 in an example implementation for an IP phone, such as Cisco's 7960 phone. It should be appreciated that communication device 500 can be of a variety of implementations, i.e., a digital cellular telephone, an IP phone (e.g., the IP phone 402), a portable computer such as a laptop, a personal digital assistant, other device, apparatus, appliances, and the like. In one example implementation, communication device 400 comprises an analog telephone adapter or ATA.

Referring to FIG. 5, communication device 500 comprises a sturdy case 501, e.g., of a tough plastic or comparably suitable composition. Case 501 provides structural integrity for other components in device 500. Functionality of device 500 is provided with circuitry 580, which is internal to device 500 and isolated from the environment in which the device is deployed from contamination or user contact.

Circuitry 580 includes components such as processors, memory, signal processing, transceiving, modulating and demodulating, multiplexing and demultiplexing, control, amplifying, power management, discrete, IC, and other components, which can be coupled with a bus and other conductors, signal, data, etc. flow paths, power devices such as battery and other components. Components of circuitry of 580 and their effective interrelations are well known in the communicating, computing and related arts. A specific example is the Cisco 7960 phone with the appropriate software and firmware, implementing functionality to carry out the above described method, such as detecting voice mail spam and categorizing those voice mails as such. Circuitry 580 can also be configured to allow user to mark a particular voice mail message as spam. Furthermore, circuitry 580 functions to allow device 500 to provide graphical information with display component 506.

A user can, in various implementations, interface with circuitry 580 to operate device 500 using one or more of several modalities. For example, familiar telephonic operation can be conducted using hard keys 520. Other routine operations can be performed with keys 522. Software based interface modalities for user interface with circuitry 580 comprises a graphical user interface (GUI) 530 and the accompanying soft keys 532.

Upon retrieving and displaying the voice mail messages on display component 506, a user determines that a particular message is spam. The user can mark the message as spam. In one implementation, the user can use hard keys 520 on device 500 to provide an input to circuitry 580. In another implementation, programmable or soft keys 532 provided with GUI 530, allows the user to report the voice message as spam. In yet another implementation, the user can mark the voice message as spam using a web interface, Alternatively, using a touch screen as part of the user interface enables the use of virtual keys on the display 506.

Circuitry 580 may store information associated with known spammers (e.g., spam voice mail messages) into a database. The information stored may comprise caller ID, time the voice mail message left, extension of the user or recipient, length of the voice mail message, knowledge about the caller identification, knowledge of what being said, etc. In one example, upon receipt of an incoming voice mail message, circuitry 580 compares information associated with the incoming message with the information stored in the database. If there is a match (such as matching caller ID), then the incoming message is categorized as spam. Alternatively, circuitry 580 compares information associated with the incoming voice message with information associated with other voice mail messages in the device. If the preponderance of the information compared is within a configurable percentage of each other or satisfying some other configured criteria, then those messages are categorized as suspected spam.

The information related to known spammers stored in the database may be shared with the network via communication medium 401; this sharing has the advantage of networking individually acquired and/or accumulated "intelligence" relating to voice mail spam.

Having described example embodiments, it should be apparent that a person skilled in the art can make modifications and variations in light of the above teachings, Therefore, any changes to the disclosed embodiments will be within the scope and the spirit of the claims.

The invention claimed is:

1. A method, comprising:
   detecting an incoming voice mail message to a voice mail system;
   accessing information associated with the incoming voice mail message;
   comparing the information associated with the incoming voice mail message with other information in a third-party information database that stores second information related to known spammers and known spam voice mail messages, said second information in the database comprising caller ID data associated with the known spam voice mail messages;
   comparing the information associated with the incoming voice mail message with third information associated with other voice mail messages in the voice mail system, the other voice mail messages not yet known to be related to known spammers and not yet known to be spam voice mail messages;
   categorizing the voice mail message as suspected spam based on the comparison of the information associated with the incoming voice mail message with the other information in the third-party information database and the comparison of the third information associated with the incoming voice mail message with the information associated with other voice mail messages in the voice mail system if preponderance of the information for the voice mail message compared is within a configurable percentage of each other;
   increasing spam score for the suspected spam;
   storing the categorized voice mail message as suspected spam; and
   providing an interface for receiving input from a user indicating whether the stored voice mail message is spam or legitimate.

2. The method of claim 1, in which comparing the information associated with the incoming voice mail message further comprises comparing one or more of the following attributes associated with each message:
   a time stamp;
   a user extension;
   a message length;
   a speaker identification;
   message content; and
   whether a user has tagged each message as spam.

3. The method of claim 1, in which one or more voice mail messages is categorized as suspected spam if the information associated with the incoming message matches at least some of the information in the third-party information database.

4. The method of claim 1, in which one or more voice mail messages is categorized as suspected spam if a spam score associated with each of the one or more voice mail messages exceeds a threshold.

5. The method of claim 1, further comprises using automatic speech recognition and/or speech-to-text techniques for spam detection.

6. The method of claim 1, in which the user marks the one or more voice mail messages as spam by pressing designated key on a user device.

7. The method of claim 1, in which the user marks the one or more voice mail messages as spam by using soft key features implemented with a graphical user interface (GUI) on a user device.

8. The method of claim 1, in which the user marks the one or more voice mail messages as spam by using a web based message retrieval interface.

9. The method of claim 1, in which the user marks the one or more voice mail messages as spam by using a Uniform Resource Locator (URL) or a button in an email, where the one or more voice mail messages is/are attached in the email.

10. The method of claim 1, further comprises the user marks one or more voice mail messages categorized as suspected spam as legitimate.

11. The method of claim 1, further comprises an information repository storing voice mail messages categorized as suspected spam.

12. The method of claim 1 further comprising updating the third-party information database with the information associated with the incoming voice mail message responsive to the categorizing.

13. The method of claim 1, wherein the information associated with other voice mail messages in the voice mail system includes caller ID information associated with each of the other voice mail messages in the voice mail system, lengths of each of the other voice mail messages in the voice mail system, and content information associated with each of the other voice mail messages in the voice mail system.

14. A communication device comprising circuitry operable to:
   detect an incoming voice mail message;
   access information associated with the incoming voice mail message;
   compare the information associated with the incoming voice message with other information in a third-party information database that stores second information related to known spammers and known spam voice mail messages, said second information comprising caller ID data associated with the known spam voice mail message;
   compare the information associated with the incoming voice mail message with third information associated with other voice mail messages in the voice mail system, the other voice mail messages not yet known to be related to known spammers and not yet known to be spam voice mail messages;
   categorize the voice mail message as suspected spam based on the comparison of the information associated with the incoming voice mail message with the other information in the third-party information database and the comparison of the third information associated with the incoming voice mail message with the information associated with other voice mail messages in the voice mail system if preponderance of the information for the voice mail message compared is within a configurable percentage of each other;
   increasing spam score for the suspected spam;
   store the categorized voice mail message as suspected spam; and
   provide an interface for receiving input from a user indicating whether the stored voice mail message is spam or legitimate.

15. The communication device of claim 14, in which the circuitry is further operable to store the third-party information database.

16. The communication device of claim 14, in which the circuitry is operable to obtain the information related to known spammers and known spam voice mail messages from the third-party information database via a communication medium.

17. A system, comprising:
   an information repository; and
   a voice mail system coupled to the information repository, the voice mail system including:
      means for detecting an incoming voice mail message;
      means for accessing information associated with the incoming voice mail message;
      means for comparing the information associated with the incoming voice message with other information in a third-party information database that stores second information related to known spammers and known spam voice mail messages, said second information comprising caller ID data associated with the known spam voice mail messages;
      means for comparing the information associated with the incoming voice mail message with third information associated with other voice mail messages in the voice mail system, the other voice mail messages not yet known to be related to known spammers and not yet known to be spam voice mail messages;
      means for categorizing one or more voice mail messages as suspected spam based on the comparison of the information associated with the incoming voice mail message with the other information in the third-party information database and the comparison of the third information associated with the incoming voice mail message with the information associated with other voice mail messages in the voice mail system if preponderance of the information for the voice mail message compared is within a configurable percentage of each other;
      increasing spam score for the suspected spam;
      means for storing the categorized voice mail message as suspected spam; and
      means for providing an interface for receiving input from a user indicating whether the stored voice mail message is spam or legitimate.

18. The system of claim 17, in which the voice mail system is associated with a voice mail service provider.

19. The system of claim 17, in which the voice mail system is operable to respond to a user input to mark one or more voice mail messages as spam.

20. A communicating device, comprising:
   a user interface; and
   a circuit coupled to the user interface to operate the communicating device, the circuit including:
      means for detecting an incoming voice mail message;
      means for accessing information associated with the incoming voice mail message;
      means for comparing the information associated with the incoming voice message with other information in a third-party information database that stores second information related to known spammers and known spam voice messages, said second information comprising caller ID data associated with the known spam voice mail messages;

means for comparing the information associated with the incoming voice mail message with third information associated with other voice mail messages in the voice mail system, the other voice mail messages not yet known to be related to known spammers and not yet known to be spam voice mail messages;

means for categorizing one or more voice mail messages as suspected spam based on the comparison of the information associated with the incoming voice mail message with the other information in the third-party information database and the comparison of the third information associated with the incoming voice mail message with the information associated with other voice mail messages in the voice mail system if preponderance of the information for the voice mail message compared is within a configurable percentage of each other;

increasing spam score for the suspected spam;

means for storing the categorized voice mail message as suspected spam; and means for receiving input from a user through the user interface indicating whether the stored voice mail message is spam or legitimate.

21. The communicating device of claim 20, in which the user interface comprises one or more of the following:

a hardware-based key on the communication device;

a programmable key provided with a graphical user interface (GUI); and a web interface.

22. The communication device of claim 20, in which the circuitry is further operable to store the third-party information database.

23. The communication device of claim 20, in which the circuitry is operable to obtain the information related to known spammers and known spam voice mail messages from the third-party information database via a communication medium.

* * * * *